(No Model.)

R. N. PRATT.

ASBESTUS PACKING.

No. 351,464. Patented Oct. 26, 1886.

*a*

*b*

*c*

*d*

*e*  *f*

WITNESSES
F. L. Ourand.
H. R. Williams

INVENTOR
Rufus N. Pratt
by Simonds & Burdet
Attorneys

UNITED STATES PATENT OFFICE.

RUFUS N. PRATT, OF HARTFORD, CONNECTICUT.

ASBESTUS PACKING.

SPECIFICATION forming part of Letters Patent No. 351,464, dated October 26, 1886.

Application filed March 3, 1886. Serial No. 193,842. (No model.)

*To all whom it may concern:*

Be it known that I, RUFUS N. PRATT, of Hartford, in the county of Hartford and State of Connecticut, have invented certain new and useful Improvements in Asbestus Packing, of which the following is a full, clear, and exact description, whereby any one skilled in the art can make and use the same.

My improvement relates to the class of packings made from the twisted or braided fibers of asbestus, and used to make tight the joints of fluid-valves, stuffing-boxes, pistons, and other machines and structures against the passage of hot or cold fluid, steam, or other vapor; and its object is to provide an asbestus packing in the form of a rope, cord, or wick, spun, twisted, or braided in the usual way from asbestus fibers, that may be used to pack joints of various forms and outline, that shall be elastic, impermeable to a degree, and capable of being used to pack a joint that may be repeatedly broken without requiring the renewal of the packing.

My improvement consists of a rope or cord made of asbestus fiber, spun, twisted, or braided into form in the usual manner, and saturated with adhesive and elastic material that in a measure holds the fibers together and adds to the elasticity and durability of the mass, as more particularly hereinafter described, and pointed out in the claims.

Figure 1:
Figure 2:
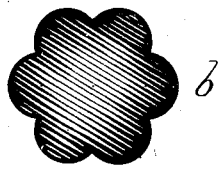
Figure 3:
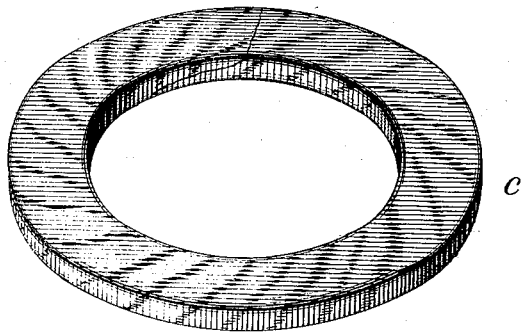
Figure 4:
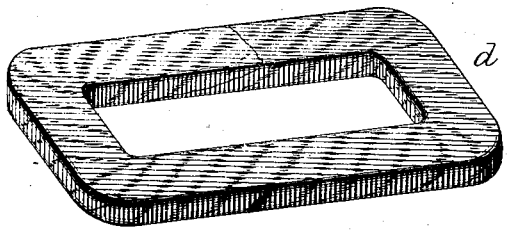
Figure 5:
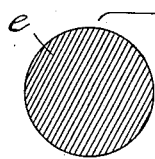
Figure 5:
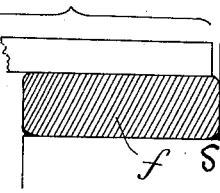

Referring to the drawings, Figure 1 is a detail view of a piece of ordinary fibrous asbestus rope twisted to shape in the usual manner. Fig. 2 is a detail cross-sectional view on enlarged scale of the asbestus rope treated and coated as in the practice of my improvement, the density of the shade lines indicating the comparative saturation of the mass. Fig. 3 is a view of a piece of my improved rope bent to form a ring-packing, the ends united by a scarfed joint. Fig. 4 is a detail plan view of my improved rope-packing for an oblong joint. Fig. 5 is a detail view in cross-section of my improved rope-packing, illustrating its shape before and after use in packing a joint, and also its adaptability to compression or change of form without destroying the integrity of the mass or its elasticity.

In the accompanying drawings, the letter *a* denotes a piece of rope made of fibrous asbestus and of a kind that is in general use for packing stuffing-boxes, pistons, or the like, the dried fiber being spun in the usual way, and the requisite number of strands twisted or braided into the several sizes of rope wanted for use. A packing is ordinarily made by cutting off a piece of this asbestus rope, bending it into shape to conform to the general outline of the joint to be packed—as oval, round, or rectangular—and then holding it in place by a gland or like part, in the usual manner. Such a packing is liable to be disintegrated by friction of the wearing parts or by pressure of steam or other fluid coming in contact with or flowing past it. In order to prevent such wasting or wearing of the packing, it has in some cases been saturated with tallow, wax, and treated with plumbago and similar lubricants; but they have not increased the adhesiveness of the fibers in the mass in a proper manner to secure sufficient elasticity and durability. A joint when packed with such a material as above described, when once broken cannot be made tight again without using a new packing.

In order to make a rope-packing adaptable to the many and various uses to which it may be put, it should have, in addition to its convenient form that enables one to obtain the required length to wrap about a piston or fit into an annular recess or one of irregular shape, in the highest degree elasticity, durability, and sufficient cohesiveness between the fibers composing the mass to enable a joint to be repeatedly packed and broken without requiring a renewal of the packing, and it should also have a surface that, while yielding and capable of adapting itself to irregularities in the joint packed by it, shall be sufficiently firm to prevent disintegration of the fibers composing it under the action of flowing fluids, as steam, or of liquids, as hot water and the like. Such a packing I have prepared by taking a length of the ordinary fibrous asbestus rope, *a*, in a dried state and passing it into a solution of rubber or like gum, in naphtha or the like vehicle, in which sulphur and plumbago are held in suspension, and retaining the rope in the solution long enough to allow it to penetrate well into the body, forming on the outside, as the rope is drawn out from it, a somewhat thick coating of the solution. After drying, the rope is again passed through the solution to add to the thickness of the surface-coating, the mass being saturated in its first immersion to a relative degree of density. (Indicated at *b* in Fig. 2 of the drawings.) Such a rope-packing is preferably run over one reel down through the solution and up over another one, the surplus solution being rubbed off as the rope emerges from it, and the surface of the packing smoothed. When the rope has been dried after the first saturation, I prefer to give it a surface-coating of dry plumbago or soapstone, or a mixture of the two, which adheres to the rubber on the surface of the packing. The whole mass of rope is then vulcanized in the ordinary manner.

This improved asbestos packing may be cut into suitable lengths and the ends scarfed and united to form a ring packing, as shown at *c* in Fig. 3, or an oblong packing, as *d* in Fig. 4. Such a packing or gasket is, when first formed, circular in cross-section, as shown at *e* in Fig. 5; but it may be compressed to a shape in cross-section, as shown at *f* in Fig. 5, without destroying the integrity of the mass or its elasticity.

When it is desired to use the rope-packing to make a special form of packing—as a ring packing—that shall be permanent in its shape, it is slightly moistened, as with naphtha, after being bent to the shape, and is then subjected to pressure between dies of proper shape. The rope, after saturation, may be first formed to the desired outline and pressed to shape while moist, and then vulcanized, producing a ring packing of considerable density, yet elastic and sufficiently yielding to adapt itself to slight irregularities in the joint to be packed.

I claim as my improvement—

1. As an improved article of manufacture, a rope or cord of fibrous asbestus soaked and coated with a compound of rubber and sulphur in a suitable vehicle, as naphtha, and further covered with plumbago or the like lubricant, all substantially as described.

2. The improved method of manufacturing asbestus packing, which consists in immersing a fibrous asbestus rope or cord in a solution of india-rubber and naphtha or the like vehicle containing sulphur, then removing the rope, wiping off the surplus, and coating the surface with plumbago, all substantially as described.

3. As an improved article of manufacture, a yarn, cord, or rope made of asbestus fiber, spun, twisted, or braided to shape, and treated by immersion in a cementing mixture of rubber, sulphur, and naphtha or the like vehicle, that permeates the mass and forms a compact and durable protection against wear, rendering it of greater density on the exterior than within the mass, and that also serves as an agent in vulcanizing; all substantially as described.

RUFUS N. PRATT.

Witnesses:
H. R. WILLIAMS,
CHAS. L. BURDETT.